(12) United States Patent
Jarrier et al.

(10) Patent No.: US 8,997,450 B2
(45) Date of Patent: Apr. 7, 2015

(54) FILTER CARTRIDGE ASSEMBLY FOR USE WITH TURBINE ENGINE SYSTEMS

(75) Inventors: Etienne Rene Jarrier, Basingstoke (GB); Charles Brake, Alton (GB); Paul Sherwood Bryant, Amesbury (GB)

(73) Assignee: BHA Altair, LLC, Franklin, TN (US)

(*) Notice: Subject to any disclaimer, the term of this patent is extended or adjusted under 35 U.S.C. 154(b) by 1149 days.

(21) Appl. No.: 12/951,858

(22) Filed: Nov. 22, 2010

(65) Prior Publication Data

US 2012/0124961 A1    May 24, 2012

(51) Int. Cl.
*F02G 3/00* (2006.01)
*F02C 7/055* (2006.01)
*B01D 46/00* (2006.01)
*B01D 46/24* (2006.01)

(52) U.S. Cl.
CPC .............. *F02C 7/055* (2013.01); *B01D 46/002* (2013.01); *B01D 46/0024* (2013.01); *B01D 46/003* (2013.01); *B01D 46/2407* (2013.01); *B01D 2265/02* (2013.01); *B01D 2275/201* (2013.01); *B01D 2279/60* (2013.01); *F05D 2250/232* (2013.01)

(58) Field of Classification Search
CPC ...... F02C 7/055; F02C 7/052; F05B 2260/63; B64D 2033/0246; B64D 2033/0273; B01D 46/2411; B01D 29/50; B01D 29/54; B01D 46/0019; B01D 46/0021; B01D 46/002
USPC ......... 60/39.092, 772; 55/485, 488, 482, 483, 55/306, 498, 490
See application file for complete search history.

(56) References Cited

U.S. PATENT DOCUMENTS

| | | | |
|---|---|---|---|
| 4,505,816 A | 3/1985 | Wozniak et al. | |
| 4,992,170 A | 2/1991 | Menon et al. | |
| 5,152,890 A * | 10/1992 | Linnersten | 210/315 |
| 5,252,207 A | 10/1993 | Miller et al. | |
| 5,484,466 A | 1/1996 | Brown et al. | |
| 6,626,715 B1 | 9/2003 | Noble | |
| 6,875,256 B2 * | 4/2005 | Gillingham et al. | 95/273 |
| 6,958,118 B2 | 10/2005 | Hill et al. | |
| 6,991,665 B1 | 1/2006 | Allen et al. | |
| 7,041,146 B2 | 5/2006 | Bugli et al. | |
| 7,115,150 B2 | 10/2006 | Johnson et al. | |
| 7,597,734 B2 * | 10/2009 | Johnson et al. | 55/482 |

(Continued)

FOREIGN PATENT DOCUMENTS

| | | |
|---|---|---|
| CN | 1468136 A | 1/2004 |
| CN | 101155623 A | 4/2008 |

(Continued)

OTHER PUBLICATIONS

Search Report issued in connection with GB Patent Application No. 1119707.6, Mar. 13, 2012.

*Primary Examiner* — Phutthiwat Wongwian
*Assistant Examiner* — Alain Chau
(74) *Attorney, Agent, or Firm* — Reinhart Boerner Van Deuren P.C.

(57) ABSTRACT

A filter cartridge assembly includes a first filter including a first cavity defined therein and a second filter coupled to the first filter. The second filter includes a second cavity defined therein in flow communication with first cavity. The filter cartridge assembly also includes at least one pre-filter extending about the first filter and the second filter such that a third cavity is defined between the at least one pre-filter and at least one of the first filter and the second filter.

15 Claims, 6 Drawing Sheets

(56) References Cited

U.S. PATENT DOCUMENTS

| | | | |
|---|---|---|---|
| 7,632,339 B2 * | 12/2009 | Singh | 95/273 |
| 2003/0132153 A1 | 7/2003 | Jelten | |
| 2003/0226795 A1 | 12/2003 | Merritt et al. | |
| 2004/0103626 A1 * | 6/2004 | Warth et al. | 55/467 |
| 2005/0235617 A1 | 10/2005 | Read | |
| 2008/0164221 A1 | 7/2008 | Brownstein et al. | |
| 2009/0020472 A1 | 1/2009 | Lucas et al. | |

FOREIGN PATENT DOCUMENTS

| | | |
|---|---|---|
| DE | 102004021180 A1 | 11/2005 |
| GB | 1602399 | 11/1981 |
| JP | 72-53028 A | 10/1995 |
| JP | 2006-314878 A | 11/2006 |
| JP | 2009-047150 A | 3/2009 |
| WO | 2006/107721 A1 | 10/2006 |
| WO | 2010/013613 A1 | 2/2010 |

* cited by examiner

FILTER CARTRIDGE ASSEMBLY FOR USE WITH TURBINE ENGINE SYSTEMS

BACKGROUND OF THE INVENTION

The present invention relates generally to turbine engines and, more specifically, to filter cartridge assemblies for use with turbine engine systems.

At least some known turbine engines include inlet filter houses that use a plurality of filter cartridges to remove particulate matter, such as dust and/or debris, from air channeled to the turbine engine. However, in at least some climates, moisture may disrupt the air flow and/or cause a differential pressure across at least some filter cartridges to increase. For example, the moisture may cause contaminants retained in the filter cartridges to swell and/or to conglomerate, and/or the moisture may promote ice formation on the filter cartridges. As such, turbine loading may be increased if the turbine requires more energy to draw air through the filter cartridges. In addition to adversely affecting turbine engine performance, such excessive turbine loading may also reduce a useful life of known filter cartridges.

In at least some known turbine systems, at least one pre-filter is coupled to at least one inlet duct of the inlet filter house. Such pre-filters may reduce, but generally do not eliminate, an amount of moisture within the air that is channeled to the filter cartridges. As such, any free moisture that remains present within the air reaching the filter cartridges over time may still increase turbine loading across the filter cartridges. Moreover, at least some known filter cartridges include a moisture coalescing material. However, despite removing moisture from the air, such moisture coalescing materials may trap particulates between the materials and the filter cartridges. As such, removal of the filter cartridges may be necessary to properly clean the filter cartridges to prevent an increase in pressure across the cartridges.

BRIEF DESCRIPTION OF THE INVENTION

In one embodiment, a filter cartridge assembly is provided that includes a first filter including a first cavity defined therein and a second filter coupled to the first filter. The second filter includes a second cavity defined therein in flow communication with first cavity. The filter cartridge assembly also includes at least one pre-filter extending about the first filter and the second filter such that a third cavity is defined between the at least one pre-filter and at least one of the first filter and the second filter.

In another embodiment, a turbine engine system is provided that includes a turbine, a compressor coupled upstream from the turbine, and an inlet filter house coupled upstream from the compressor. The inlet filter house includes at least one filter cartridge assembly configured to at least partially remove particulates and moisture from an inlet airflow channeled to the compressor. The at least one filter cartridge assembly includes a first filter including a first cavity defined therein and a second filter coupled to the first filter. The second filter includes a second cavity defined therein in flow communication with the first cavity. The at least one filter cartridge assembly also includes at least one pre-filter extending about the first filter and the second filter such that a third cavity is defined between the at least one pre-filter and at least one of the first filter and the second filter.

In yet another embodiment, a method of assembling a filter cartridge is provided that includes coupling a first filter to a second filter, wherein the second filter includes a first cavity defined therein that is in flow communication with a second cavity defined in the first filter. At least one spacer is coupled to an outer surface of at least one of the first filter and the second filter, and at least one pre-filter is coupled to an outer surface of the at least one spacer such that a third cavity is defined between the at least one pre-filter and at least one of the first filter and the second filter.

DETAILED DESCRIPTION OF THE INVENTION

Figure 1:
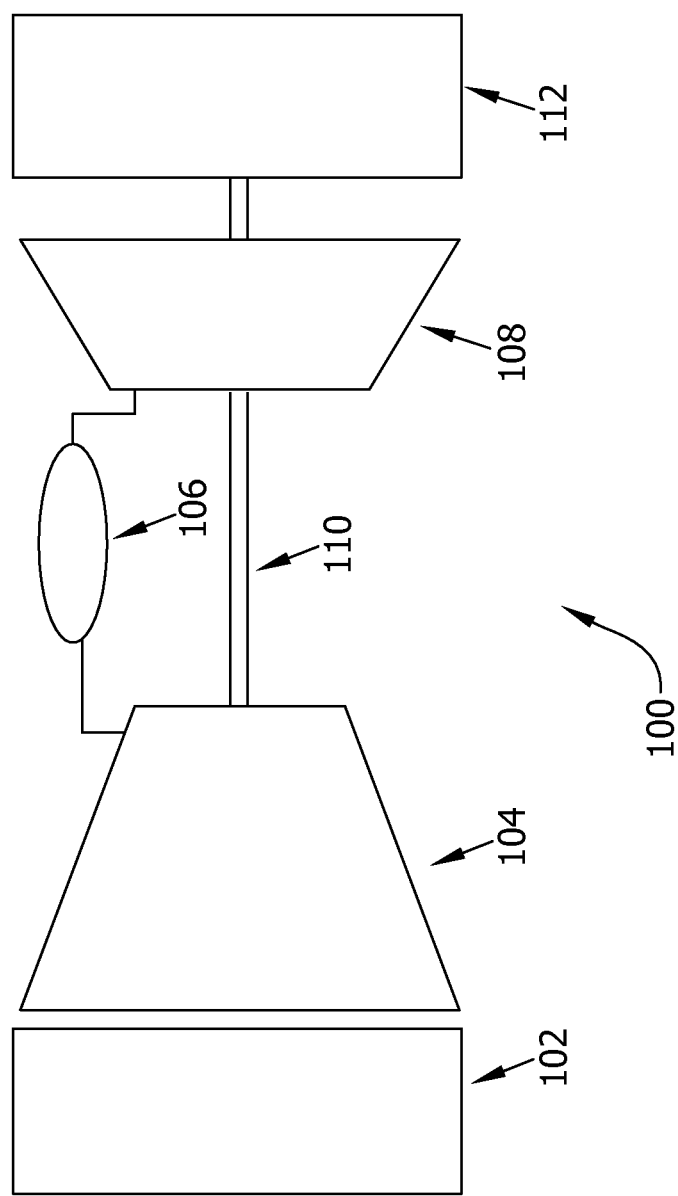
FIG. 1 is a schematic diagram of an exemplary turbine engine system.

FIG. 1 is a schematic diagram of an exemplary turbine engine system 100. In the exemplary embodiment, turbine engine system 100 is a gas turbine engine system 100 that includes an inlet filter house 102, a compressor 104, a combustor assembly 106, and a turbine 108 that is rotatably coupled to compressor 104 via a rotor shaft 110. In the exemplary embodiment, inlet filter house 102, compressor 104, combustor assembly 106, and turbine 108 are coupled together in a serial flow arrangement. Alternatively, turbine engine system 100 may include any other turbine engine system components coupled together in any flow arrangement that enables system 100 to function as described herein.

During operation, in the exemplary embodiment, ambient air is drawn into inlet filter house 102, wherein the ambient air is filtered. In the exemplary embodiment, the filtered air is channeled through an air inlet (not shown) towards compressor 104 wherein the filtered air is compressed prior to being discharged towards combustor assembly 106. Compressed air is mixed with fuel, and the resulting fuel-air mixture is ignited within combustor assembly 106 to generate combustion gases that are channeled downstream towards turbine 108. Turbine 108 extracts rotational energy from the combustion gases and rotates rotor shaft 110 to drive compressor 104. Moreover, in the exemplary embodiment, turbine engine system 100 drives a load 112, such as a generator, coupled to rotor shaft 110.

Figure 2:
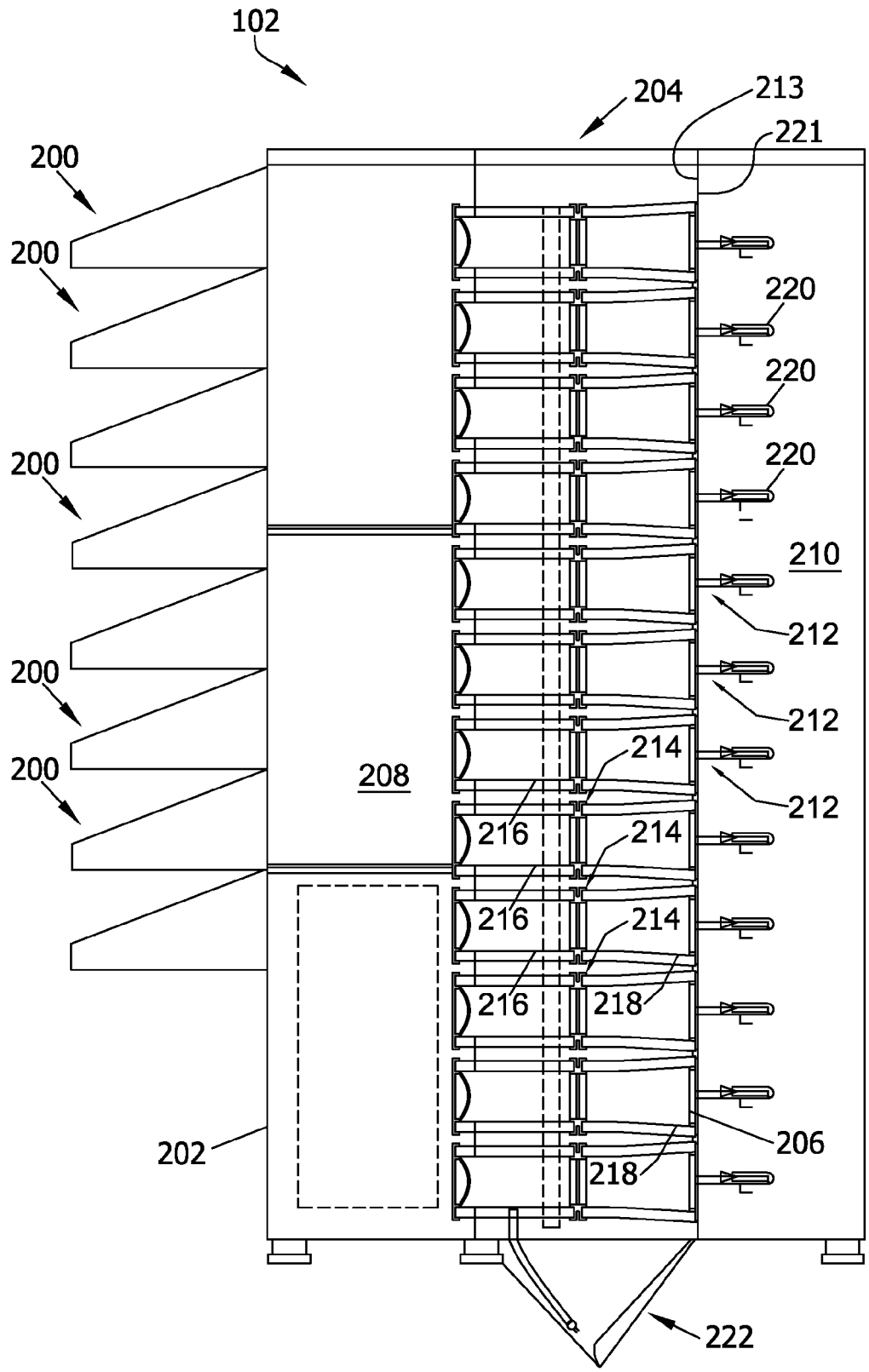
FIG. 2 is a cross-sectional view of an exemplary inlet filter house that may be used with the turbine engine system shown in FIG. 1.

FIG. 2 is a cross-sectional view of an exemplary inlet filter house 102 that may be used with system 100 (shown in FIG. 1). In the exemplary embodiment, inlet filter house 102 includes a plurality of vertically-spaced inlet hoods 200. More specifically, in the exemplary embodiment, inlet hoods 200 are coupled to an outer wall 202 of an air filter enclosure 204, such that air filter enclosure 204 is in flow communication with ambient air via inlet hoods 200.

In the exemplary embodiment, air filter enclosure 204 includes a filter grid tubesheet 206 that defines, within air filter enclosure 204, an air filter chamber 208 that is upstream from tubesheet 206 and a clean air chamber 210 that is downstream from tubesheet 206. In the exemplary embodiment, tubesheet 206 includes a plurality of apertures 212 defined therein that each extend therethrough such that air filter chamber 208 is coupled in flow communication with clean air chamber 210 via apertures 212.

A plurality of filter cartridge assemblies 214, in the exemplary embodiment, are each coupled to an upstream side 213 of tubesheet 206 within air filter chamber 208. More specifically, each aperture 212 is sized, shaped, and oriented to receive a corresponding filter cartridge assembly 214 therein such that air filter chamber 208 is coupled in flow communication with clean air chamber 210 via filter cartridge assemblies 214. In the exemplary embodiment, each filter cartridge assembly 214 includes a cylindrical portion 216 and a conical portion 218 that extends from cylindrical portion 216. Alternatively, filter cartridge assembly 214 may be a single filter element and/or may have any shape or size that enables inlet filter house 102 to function as described herein. Moreover, in the exemplary embodiment, filter cartridge assemblies 214 are all identical. Alternatively, any number, shape, or orientation of filter cartridge assemblies 214 may be used that enables inlet filter house 102 to function as described herein.

In the exemplary embodiment, a plurality of compressed air pulse cleaners 220 are each coupled to a downstream side 221 of tubesheet 206 within clean air chamber 210. More specifically, in the exemplary embodiment, each compressed air pulse cleaner 220 is oriented to direct compressed air through a corresponding aperture 212 and/or through a respective filter cartridge assembly 214. For example, during a pulse cleaning operation of filter cartridge assemblies 214, compressed air pulse cleaners 220 pulse one or more flows of air through apertures 212 to create shockwaves that facilitate removing particulate matter, such as dust and/or debris, from filter cartridge assemblies 214. In the exemplary embodiment, a collection hopper 222 is coupled to air filter chamber 208 to collect dust and/or debris that settles within air filter chamber 208.

During operation, in the exemplary embodiment, ambient air is channeled through inlet hoods 200 to air filter enclosure 204. At least some dust and/or debris entrained in the air entering air filter enclosure 204 may be gravity-fed into collection hopper 222. In addition, during operation, filter cartridge assemblies 214 remove at least some dust and/or debris carried by air channeled through air filter chamber 208. In the exemplary embodiment, filtered air is then channeled downstream through apertures 212 and into clean air chamber 210 prior to being channeled to compressor 104 (shown in FIG. 1). To facilitate removing dust and/or debris from filter cartridge assemblies 214, compressed air pulse cleaners 220 pulse a flow of jet air through apertures 212 and/or filter cartridge assemblies 214. Dust and/or debris removed from filter cartridge assemblies 214 falls into collection hopper 222.

Figure 3:
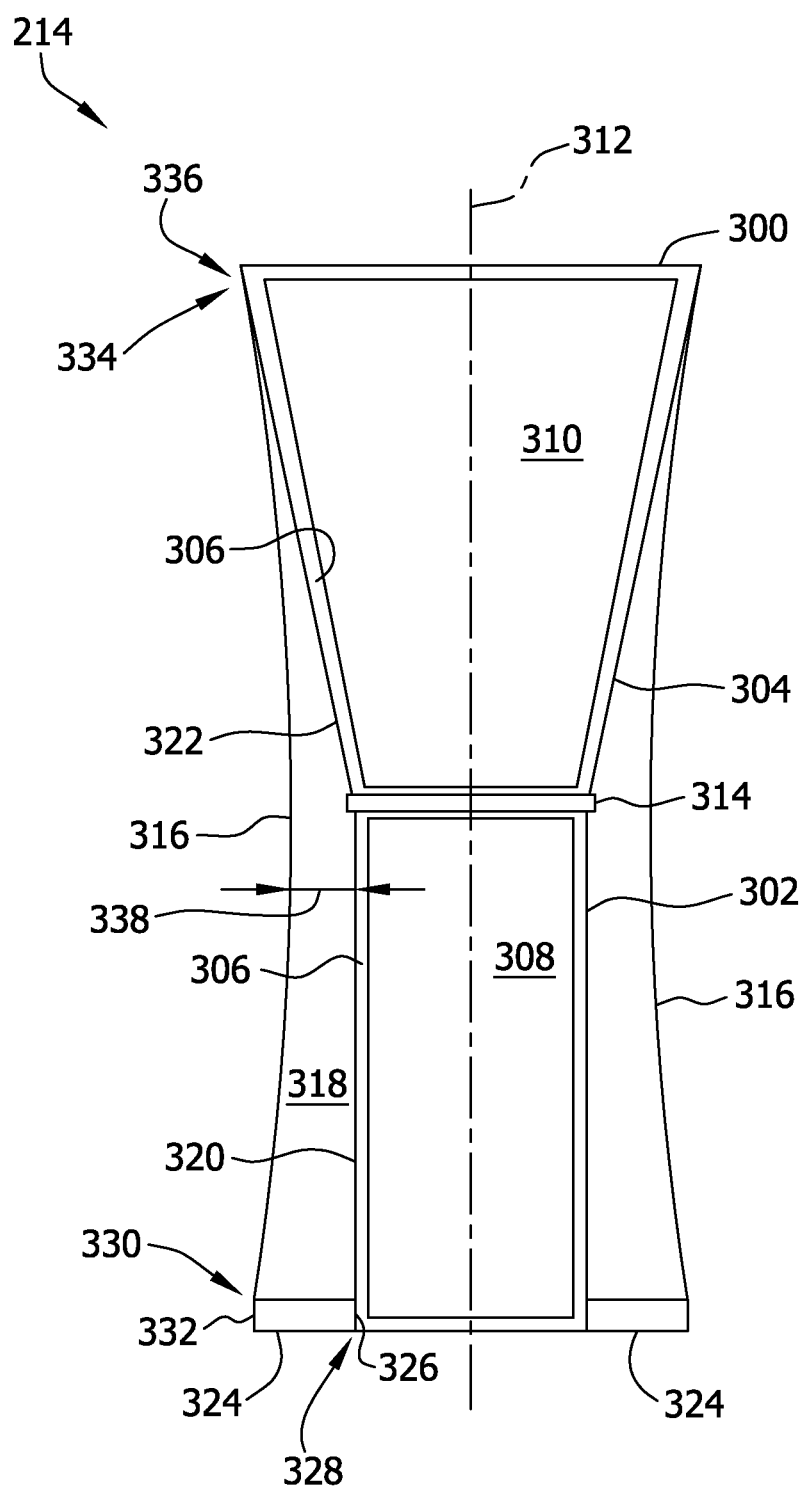
FIG. 3 is a side cross-sectional view of an exemplary filter cartridge assembly that may be used with the inlet filter house shown in FIG. 2.

FIG. 3 is a side cross-sectional view of an exemplary filter cartridge assembly 214 that may be used with inlet filter house 102 (shown in FIG. 1) and/or air filter enclosure 204 (shown in FIG. 2). In the exemplary embodiment, filter cartridge assembly 214 includes a pulse filter cartridge 300 that includes a first filter 302 and a second filter 304 that are coupled substantially concentrically together in a serial flow arrangement. In the exemplary embodiment, first filter 302 and second filter 304 each include a pleated filter media 306 that is substantially gas permeable and that is substantially impermeable to particulates. Moreover, filter media 306 may be fabricated from any combination of materials such as, but not limited to, polyester, acrylic and/or polypropylene. Alternatively, filter cartridge assembly 214 may include any filter media 306 that enables filter cartridge assembly 214 to function as described herein.

In the exemplary embodiment, first filter 302 is substantially cylindrical, and second filter 304 is substantially frustoconical. Moreover, first filter 302 and second filter 304 are each substantially hollow, such that a first cavity 308 is defined within first filter 302 and a second cavity 310 is defined within second filter 304. When first filter 302 is coupled to second filter 304, first cavity 308 is in flow communication with second cavity 310. Moreover, in the exemplary embodiment, first filter 302 and second filter 304 each have a substantially annular cross-sectional profile (not shown) that extends about a centerline axis 312. Alternatively, first filter 302 and/or second filter 304 have any other shape and/or configuration that enables filter cartridge assembly 214 to function as described herein. Moreover, first filter 302, in the exemplary embodiment, is sealingly coupled to second filter 304 via a gasket 314 extending between first filter 302 and second filter 304.

Filter cartridge assembly 214, in the exemplary embodiment, includes a third, or pre-filter 316. In the exemplary embodiment, pre-filter 316 extends about first filter 302 and second filter 304 such that an intermediate cavity 318 is defined between pre-filter 316 and filters 302 and 304. In the exemplary embodiment, pre-filter 316 is manufactured from any combination of materials that enables pre-filter 316 to at least partially remove moisture, such as water droplets, from inlet airflow channeled through pre-filter 316. Such materials may include, but are not limited to only including, a knitted fabric, such as a raschel weave net and/or a shade cloth. Alternatively, pre-filter 316 may be manufactured from any other materials that enable filter cartridge assembly 214 to function as described herein. Moreover, in the exemplary embodiment, pre-filter 316 facilitates coalescing water droplets, and channeling water away from first filter 302 and second filter 304, such as towards collection hopper 222 (shown in FIG. 2) when filter cartridge assembly 214 is installed within air filter enclosure 204 (shown in FIG. 2).

In the exemplary embodiment, pre-filter 316 is coupled to an outer surface 320 of first filter 302 and/or to an outer surface 322 of second filter 304 using at least one spacer 324 that at least partially defines intermediate cavity 318. In the exemplary embodiment, spacer 324 is annular and substantially circumscribes first filter 302 and/or second filter 304. Alternatively, a plurality of spacers 324 extend about first filter 302 and/or second filter 304, such as at discrete positions (not shown) about a circumference (not shown) of outer surface 320 and/or 322. Moreover, in the exemplary embodiment, a radially inner surface 326 of spacer 324 is coupled to, or is coupled adjacent to, an upstream end 328 of outer surface 320. An upstream end 330 of pre-filter 316 is coupled to a radially outer surface 332 of spacer 324. In the exemplary embodiment, a downstream end 334 of pre-filter 316 is coupled to a downstream end 336 of outer surface 322. As such, spacer 324 facilitates maintaining pre-filter 316 a distance 338 from outer surfaces 320 and 322 such that intermediate cavity 318 is defined substantially annularly about outer surfaces 320 and 322.

Moreover, spacer 324, in the exemplary embodiment, may be manufactured from any materials that enable spacer 324 to operate within an abrasive, corrosive, and/or humid environment. Such materials may include, but are not limited to only including, aluminum, stainless steel, galvanized metal, plastic, and/or wood. Alternatively, spacer 324 may be manufactured from any other materials that enable filter cartridge assembly 214 to function as described herein.

During operation, filter cartridge assembly 214 is installed within air filter enclosure 204, and, more specifically, filter cartridge assembly 214 is coupled to tubesheet 206 (shown in FIG. 2). Air channeled through air filter enclosure 204 towards filter cartridge assembly 214 is channeled through pre-filter 316. Pre-filter 316 removes at least a portion of water vapor that may be entrained in the air. Air flows through intermediate cavity 318 and through filter media 306 of filters 302 and 304. Filter media 306 facilitates at least partially removing particulates and/or pollutants entrained in the air. The cleaned air is channeled through first cavity 308, second cavity 310, and aperture 212, and into clean air chamber 210 (both shown in FIG. 2). As such, filter cartridge assembly 214 facilitates removing moisture and/or particulates from airflow entering inlet filter house 102, and thus facilitates providing substantially clean, dry air to compressor 104 (shown in FIG. 1).

As described herein, pre-filter 316 and spacer 324 enable pulse cleaning to be performed on filter cartridge assembly 214 and/or on pulse filter cartridge 300. More specifically, spacer 324 facilitates forming intermediate cavity 318 that separates pre-filter 316 from first filter 302 and second filter 304. As such, when air is directed through first filter 302 and/or second filter 304 via air pulse cleaners 220 (shown in FIG. 2), debris and/or particulates are facilitated to be channeled towards collection hopper 222 (shown in FIG. 2). In contrast, known filter cartridge assemblies that do not include spacer 324 and/or intermediate cavity 318 may be unable to effectively execute a pulse cleaning operation as particulates may be trapped between a pre-filter and a filter media. Accordingly, existing filter cartridges may be retrofitted with pre-filter 316 and spacer 324 to enable the filter cartridge to at least partially remove moisture from an inlet airflow.

Figure 4:
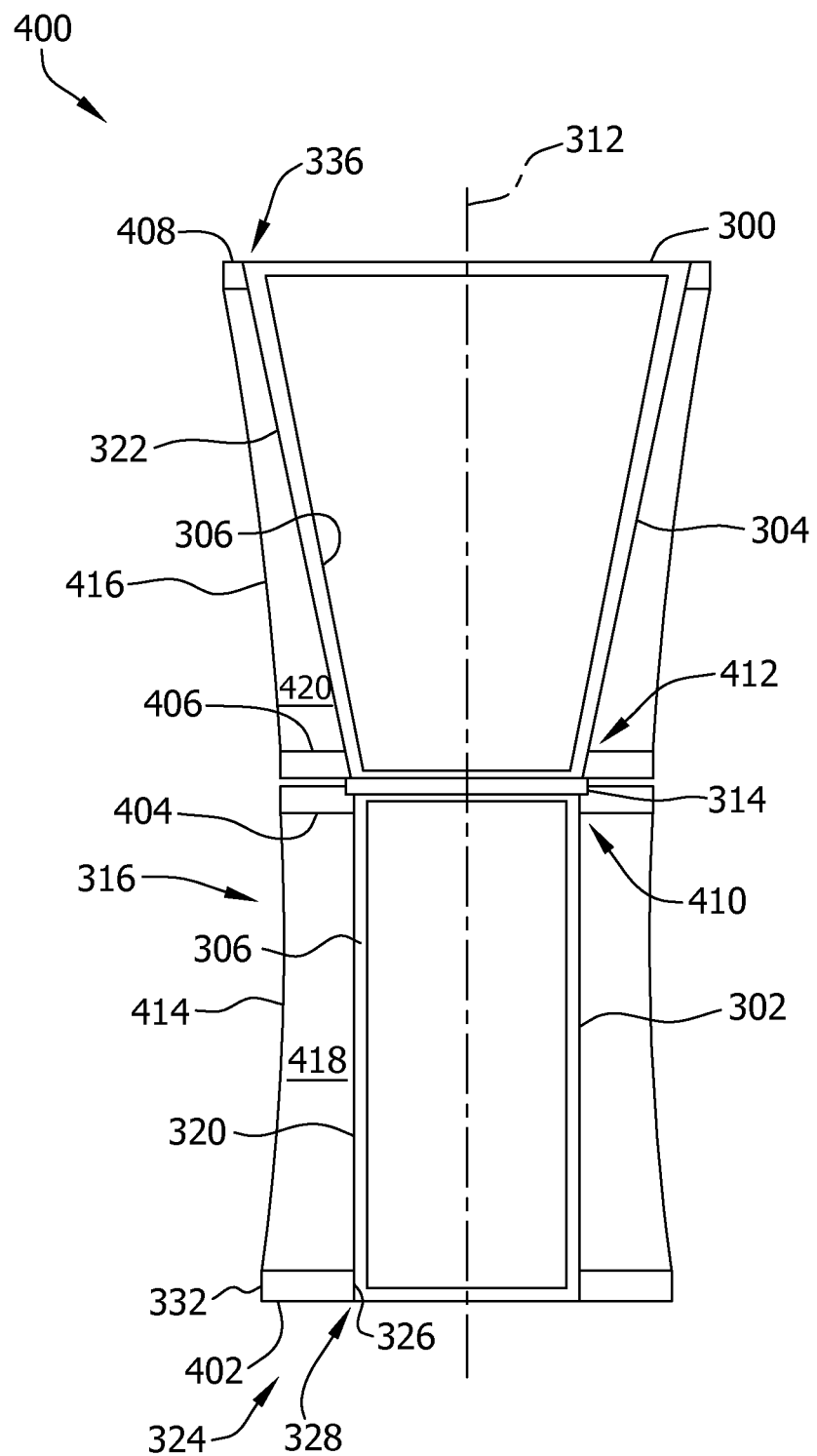
FIGS. 4-6 are side cross-sectional views of alternative filter cartridge assemblies that may be used with the inlet filter house shown in FIG. 2.

FIG. 4 is a side cross-sectional view of an alternative filter cartridge assembly 400 that may be used with inlet filter house 102 (shown in FIG. 1) and air filter enclosure 204 (shown in FIG. 2). Unless otherwise specified, filter cartridge assembly 400 is similar to filter cartridge assembly 214 (shown in FIG. 3), and similar components are labeled in FIG. 4 with the same reference numerals used in FIG. 3. As such, in the exemplary embodiment, filter cartridge assembly 400 includes first filter 302, second filter 304, pleated filter media 306, and gasket 314.

Moreover, in the exemplary embodiment, at least one pre-filter 316 is coupled to first filter outer surface 320 and to second filter outer surface 322 via a plurality of spacers 324. In the exemplary embodiment, each spacer 324 is annular and substantially circumscribes first filter 302 and/or second filter 304. More specifically, in the exemplary embodiment, spacers 324 include at least a first spacer 402, a second spacer 404, a third spacer 406, and a fourth spacer 408. Alternatively, any number of spacers 324 may be used within filter cartridge assembly 400 that enables assembly 400 to function as described herein.

In the exemplary embodiment, first spacer 402 is coupled to, or is coupled adjacent to, upstream end 328 of outer surface 320, and second spacer 404 is coupled to, or is coupled adjacent to, a downstream end 410 of outer surface 320. Moreover, third spacer 406 is coupled to, or is coupled adjacent to, an upstream end 412 of outer surface 322, and fourth spacer 408 is coupled to, or is coupled adjacent to, downstream end 336 of outer surface 322. In the exemplary embodiment, a first pre-filter 414 is coupled to first filter 302 by first spacer 402 and second spacer 404, and a second pre-filter 416 is coupled to second filter 304 by third spacer 406 and fourth spacer 408. As such, a first intermediate cavity 418 is defined between first filter 302, first pre-filter 414, first spacer 402, and second spacer 404. Moreover, a second intermediate cavity 420 is defined between second filter 304, second pre-filter 416, third spacer 406, and fourth spacer 408. Alternatively, a single pre-filter 316 may be coupled to spacers 402, 404, 406, and/or 408. In the exemplary embodiment, spacers 402, 404, 406, and 408 facilitate providing a more robust support for first pre-filter 414 and second pre-filter 416, as compared to a filter cartridge assembly 214 that includes fewer spacers 324. In other respects, filter cartridge assembly 400 functions similarly to filter cartridge assembly 214.

Figure 5:
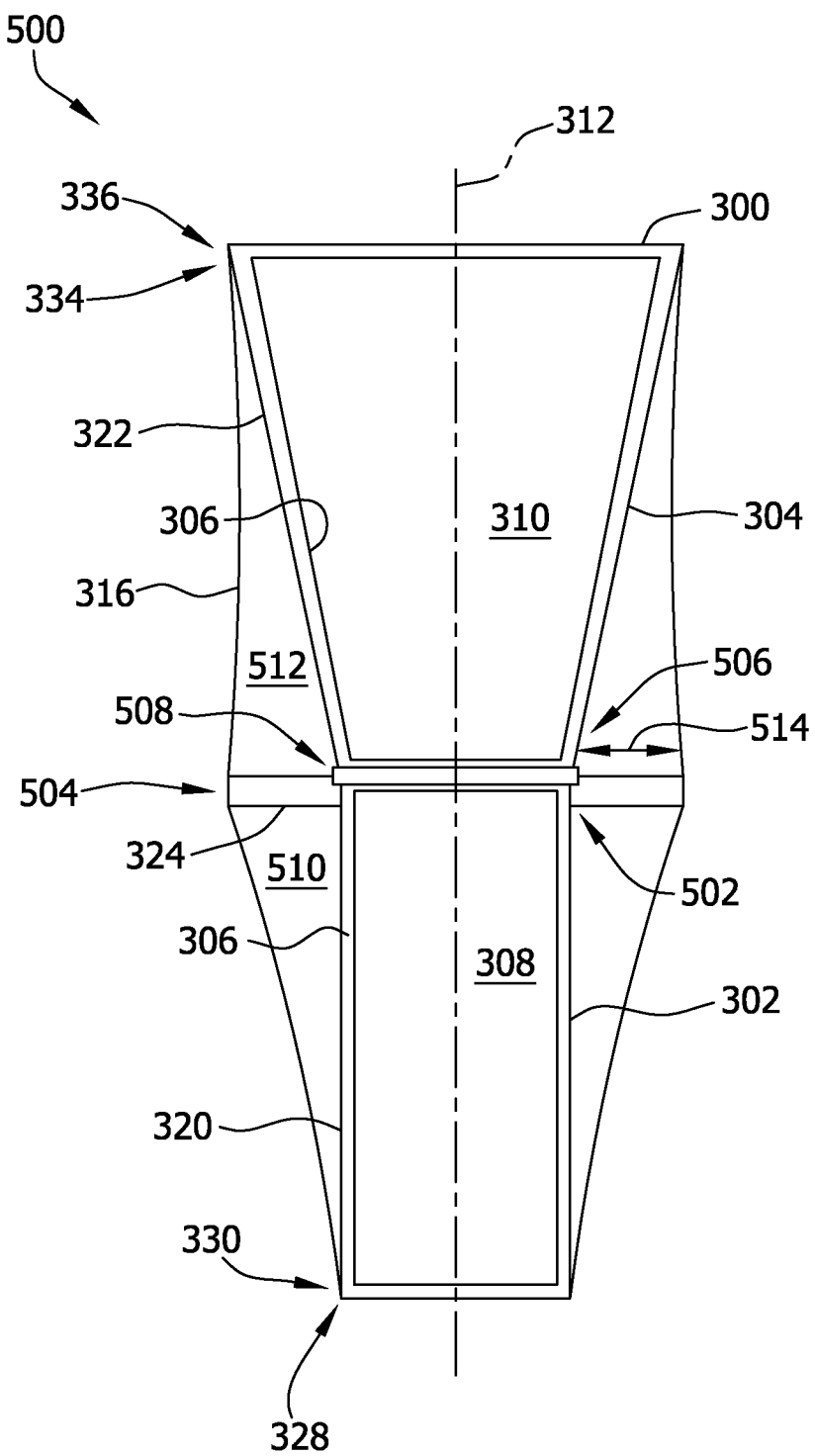

FIG. 5 is a side cross-sectional view of another alternative filter cartridge assembly 500 that may be used with inlet filter house 102 (shown in FIG. 1) and air filter enclosure 204 (shown in FIG. 2). Unless otherwise specified, filter cartridge assembly 500 is similar to filter cartridge assembly 214 (shown in FIG. 3), and similar components are labeled in FIG. 5 with the same reference numerals used in FIG. 3. As such, in the exemplary embodiment, filter cartridge assembly 500 includes first filter 302, second filter 304, pleated filter media 306, gasket 314, and pre-filter 316.

In the exemplary embodiment, pre-filter 316 is coupled to first filter outer surface 320 and/or to second filter outer surface 322 via at least one spacer 324. In the exemplary embodiment, spacer 324 is annular and substantially circumscribes first filter 302 and/or second filter 304. Alternatively, any number, shape, and/or configuration of spacers 324 may be used within filter cartridge assembly 500 that enables assembly 500 to function as described herein.

Moreover, in the exemplary embodiment, spacer 324 is coupled to, or is coupled adjacent to, a downstream end 502 of outer surface 320, and a middle portion 504 of pre-filter 316 is coupled to spacer 324. Alternatively, spacer 324 may be coupled to, or coupled adjacent to, an upstream end 506 of outer surface 322, and/or spacer 324 may be coupled adjacent to or across a junction 508 of downstream end 502 and upstream end 506. In the exemplary embodiment, upstream end 330 of pre-filter 316 is coupled to upstream end 328 of outer surface 320, and downstream end 334 of pre-filter 316 is coupled to downstream end 336 of outer surface 322. Moreover, a first intermediate cavity 510 is defined between spacer 324, outer surface 320, and pre-filter 316, and a second intermediate cavity 512 is defined between spacer 324, outer surface 322, and pre-filter 316. As such, spacer 324 facilitates maintaining pre-filter 316 a distance 514 from outer surfaces 320 and 322 such that first intermediate cavity 510 and second intermediate cavity 512 are defined substantially annularly about outer surfaces 320 and 322. In other respects, filter cartridge assembly 500 functions similarly to filter cartridge assembly 214.

Figure 6:
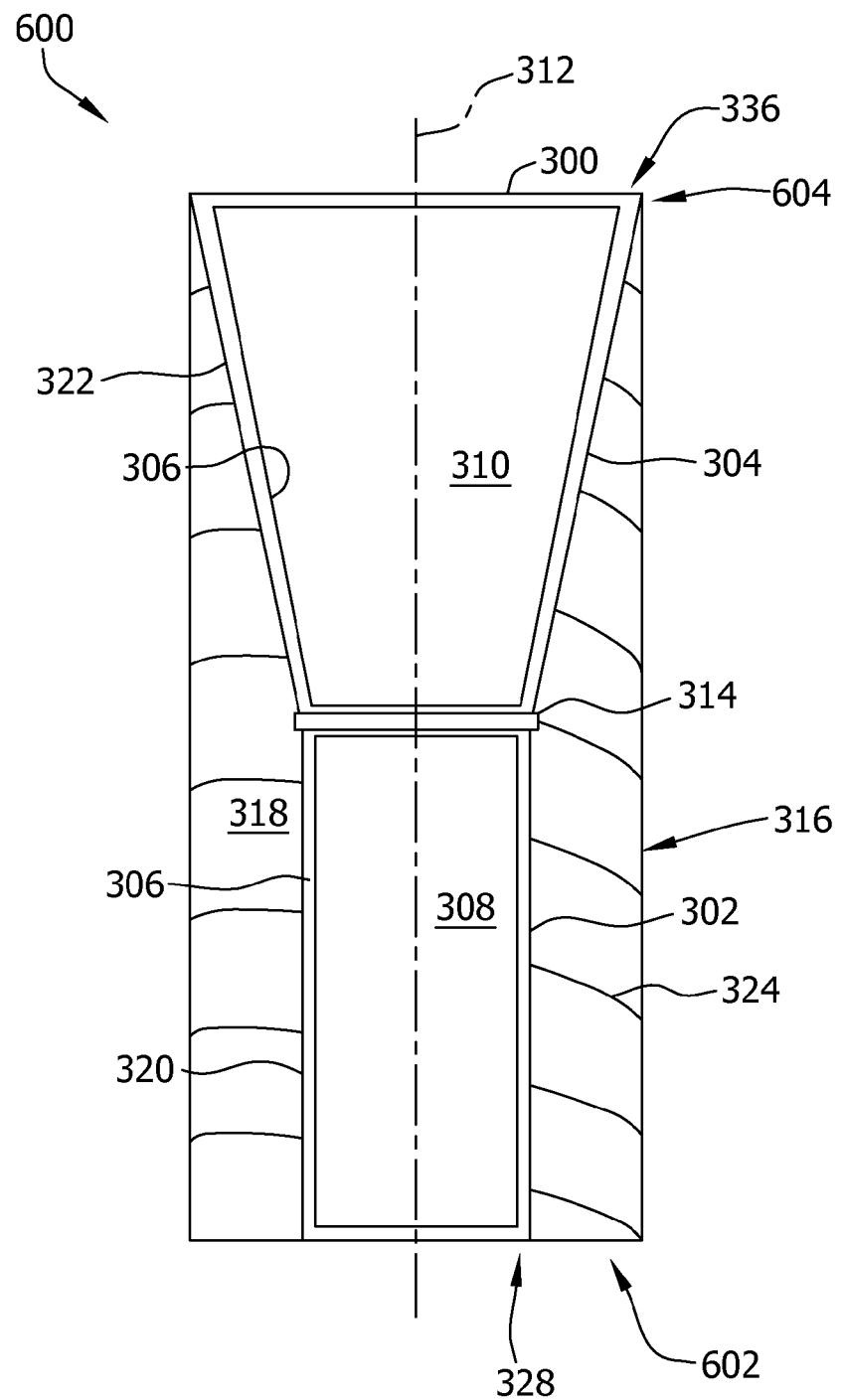

FIG. 6 is a side cross-sectional view of yet another alternative filter cartridge assembly 600 that may be used with inlet filter house 102 (shown in FIG. 1) and air filter enclosure 204 (shown in FIG. 2). Unless otherwise specified, filter cartridge assembly 600 is similar to filter cartridge assembly 214 (shown in FIG. 3), and similar components are labeled in FIG. 6 with the same reference numerals used in FIG. 3. As such, in the exemplary embodiment, filter cartridge assembly 600 includes first filter 302, second filter 304, pleated filter media 306, gasket 314, and pre-filter 316.

In the exemplary embodiment, pre-filter 316 is positioned about outer surface 320 of first filter 302 and/or outer surface 322 of second filter 304 via at least one spacer 324 such that intermediate cavity 318 is defined. In the exemplary embodiment, spacer 324 is helical, and is positioned circumferentially about first filter 302 and second filter 304. More specifically, in the exemplary embodiment, spacer 324 is a spring that biases pre-filter 316 radially outward from outer surfaces 320 and 322 when pre-filter 316 is coupled to spacer 324. Alternatively, spacer 324 is any shape, configuration, and/or structure that enables filter cartridge assembly 600 to function as described herein. Moreover, in the exemplary embodiment, an upstream end 602 of spacer 324 is coupled to, or is coupled adjacent to, upstream end 328 of outer surface 320, and a downstream end 604 of spacer 324 is coupled to, or is coupled adjacent to, downstream end 336 of outer surface 322.

The filter cartridge assemblies described herein overcome at least some of the disadvantages of known filter cartridges by providing a moisture coalescing pre-filter that is spaced a distance radially outward and about a pulse filter cartridge by at least one spacer. Each filter cartridge assembly facilitates removing moisture droplets from air before the air reaches the pulse cartridge. Moreover, each pulse filter cartridge may include a pair of filters that facilitate removing particulates from the air. Because the pre-filter is separated from the pulse cartridge by an intermediate cavity, pulsed air may be directed into and/or through the pulse filter cartridge to facilitate cleaning the cartridge. As such, moisture and/or particulates may be removed from an inlet airflow stream channeled to a turbine compressor, and as importantly, the filter cartridges may be effectively cleaned while the turbine system is in operation.

As described herein, a robust and cost-effective filter cartridge assembly is provided that removes moisture droplets and particulates from an inlet airflow directed towards a turbine. More specifically, each exemplary filter cartridge assembly described herein includes a pre-filter that is spaced about the pulse cartridge by at least one spacer. Additionally, in contrast to known filter cartridges, the exemplary embodiments described herein enable the filter cartridge assembly to effectively remove moisture while enabling a pulse cleaning operation to be performed on the pulse filter cartridge during operation of the turbine. Thus, the exemplary filter cartridge assembly facilitates reducing a cost of maintaining the turbine engine system.

Exemplary embodiments of filter assemblies for a gas turbine engine are described above in detail. The exemplary assemblies are not limited to the specific embodiments described herein, but rather, components of the assemblies may be utilized independently and separately from other components described herein. For example, the filter cartridge assemblies may be used in combination with other systems and methods, and are not limited to practice with only the turbine engine system as described herein. Rather, the exemplary embodiments can be implemented and utilized in connection with many other combustion system and air filtration applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A filter cartridge assembly comprising:
a first filter including a first cavity defined therein;
a second filter coupled to said first filter, said second filter including a second cavity defined therein in flow communication with said first cavity;
at least one pre-filter extending about said first filter and said second filter such that a third cavity is defined between said at least one pre-filter and at least one of said first filter and said second filter, wherein air flow from the third cavity to the second cavity passes through at least one of said first filter and said second filter, wherein the pre-filter is a water coalescing filter configured to channel water away from the first filter and the second filter;
at least one spacer extending between said at least one pre-filter and at least one of said first filter and said second filter such that said third cavity is at least partially defined by said at least one spacer, said at least one pre-filter, and said at least one of said first and said second filter, wherein said at least one spacer is at the same axial location along a centerline of the filter cartridge assembly as a junction of said first filter and said second filter.

2. A filter cartridge assembly in accordance with claim 1, wherein said first filter is substantially cylindrical.

3. A filter cartridge assembly in accordance with claim 1, wherein said second filter is substantially frusto-conical.

4. A filter cartridge assembly in accordance with claim 1, wherein at least one second spacer is coupled to an upstream end of said first filter.

5. A filter cartridge assembly in accordance with claim 1, wherein said at least one spacer is helical, said at least one pre-filter is coupled to said at least one spacer such that said pre-filter is biased radially outward from said first filter and said second filter.

6. A filter cartridge assembly in accordance with claim 1, wherein said at least one pre-filter comprises a first pre-filter and a second pre-filter, and wherein said at least one spacer comprises a first spacer coupled to said first pre-filter and a second spacer coupled to said second pre-filter.

7. A turbine engine system comprising:
a turbine;
a compressor coupled upstream from said turbine; and
an inlet filter house coupled upstream from said compressor and comprising at least one filter cartridge assembly configured to at least partially remove particulates and moisture from an inlet airflow channeled to said compressor, said at least one filter cartridge assembly comprising:
a first filter including a first cavity defined therein;
a second filter coupled to said first filter, said second filter including a second cavity defined therein in flow communication with said first cavity;
at least one pre-filter extending about said first filter and said second filter such that a third cavity is defined between said at least one pre-filter and at least one of said first filter and said second filter, wherein air flow from the third cavity to the second cavity passes through at least one of said first filter and said second filter, wherein the pre-filter is a water coalescing filter configured to channel water away from the first filter and the second filter;
at least one spacer extending between said at least one pre-filter and at least one of said first filter and said second filter such that said third cavity is at least partially defined by said at least one spacer, said at least one pre-filter, and said at least one of said first and said second filter, wherein said at least one spacer is at the same axial location along a centerline of the filter cartridge assembly as a junction of said first filter and said second filter.

8. A turbine engine system in accordance with claim 7, wherein said first filter is substantially cylindrical.

9. A turbine engine system in accordance with claim 7, wherein said second filter is substantially frusto-conical.

10. A turbine engine system in accordance with claim 7, wherein at least one second spacer is coupled to an upstream end of said first filter.

11. A turbine engine system in accordance with claim 7, wherein said at least one spacer is helical, said at least one pre-filter is coupled to said at least one spacer such that said pre-filter is biased radially outward from said first filter and said second filter.

12. A turbine engine system in accordance with claim 7, wherein said at least one pre-filter comprises a first pre-filter and a second pre-filter, and wherein said at least one spacer comprises a first spacer coupled to said first pre-filter and a second spacer coupled to said second pre-filter.

13. A method of assembling the filter cartridge assembly of claim 1, said method comprising:
providing a first filter including a first cavity defined therein;
providing a second filter including a second cavity defined therein;
coupling the first filter to the second filter to place the first cavity in flow communication with the second cavity;
coupling at least one spacer to an outer surface of at least one of the first filter and the second filter wherein said at least one spacer is at the same axial location along a centerline of the filter cartridge assembly as a junction of said first filter and said second filter; and
coupling at least one pre-filter to an outer surface of the at least one spacer such that a third cavity is defined between the at least one pre-filter and at least one of the first filter and the second filter, wherein air flow from the third cavity to the second cavity passes through at least one of said first filter and said second filter, wherein the pre-filter is a water coalescing filter configured to channel water away from the first filter and the second filter.

14. A method in accordance with claim 13, further comprising the step of providing at least one second spacer coupled to an upstream end of said first filter.

15. A method in accordance with claim 13, wherein coupling the at least one spacer to at least one of the first filter and the second filter comprises coupling a helical spacer to the first filter and the second filter such that the at least one pre-filter is biased radially outward from the first filter and the second filter.

* * * * *